United States Patent
Arshad et al.

(10) Patent No.: US 11,861,858 B2
(45) Date of Patent: Jan. 2, 2024

(54) SYSTEM AND METHOD FOR AUTOMATIC CONTAINER CONFIGURATION USING FIDUCIAL MARKERS

(71) Applicant: ZEBRA TECHNOLOGIES CORPORATION, Lincolnshire, IL (US)

(72) Inventors: Bassam S. Arshad, Wheeling, IL (US); Justin F. Barish, Kings Park, NY (US); Jay J. Williams, Glenview, IL (US); Adithya H. Krishnamurthy, Hicksville, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 208 days.

(21) Appl. No.: 17/154,472

(22) Filed: Jan. 21, 2021

(65) Prior Publication Data
US 2022/0230339 A1    Jul. 21, 2022

(51) Int. Cl.
- *B64D 9/00* (2006.01)
- *G06T 7/11* (2017.01)
- *G06T 7/521* (2017.01)
- *G06T 7/586* (2017.01)
- *G06T 7/73* (2017.01)

(52) U.S. Cl.
CPC .............. *G06T 7/586* (2017.01); *G06T 7/521* (2017.01); *G06T 7/73* (2017.01); *G06T 2207/20132* (2013.01); *G06T 2207/30208* (2013.01)

(58) Field of Classification Search
None
See application file for complete search history.

(56) References Cited

U.S. PATENT DOCUMENTS

| | | | |
|---|---|---|---|
| 2016/0005229 A1* | 1/2016 | Lee | G06T 11/60 345/419 |
| 2017/0193312 A1* | 7/2017 | Ai | G01S 17/42 |
| 2018/0176483 A1* | 6/2018 | Knorr | H04N 5/2723 |
| 2021/0049780 A1* | 2/2021 | Westmacot | G06T 7/75 |
| 2021/0053407 A1* | 2/2021 | Smith | B25J 9/1697 |
| 2021/0142497 A1* | 5/2021 | Pugh | G06T 7/55 |
| 2021/0224973 A1* | 7/2021 | Holzer | G06T 5/50 |
| 2022/0230339 A1* | 7/2022 | Arshad | G06T 7/73 |

OTHER PUBLICATIONS

Aalerud et al., "Automatic Calibration of an Industrial RGB-D Camera Network Using Retroreflective Fiducial Markers," Sensors 2019, 19, 1561; doi:10.3390/s19071561 (Year: 2019).*

* cited by examiner

*Primary Examiner* — Soo Shin

(57) ABSTRACT

Methods and systems for determining rotation and clipping parameters for images of unit load devices (ULDs) are disclosed herein. An example method includes capturing a set of image data featuring a ULD. The example method may further include locating a fiducial marker proximate to the ULD within the set of image data. The example method may further include cropping the set of image data, based upon the located fiducial marker, to generate a set of marker point data and a set of floor point data. The example method may further include rotating the set of image data based upon the set of marker point data and the set of floor point data, and clipping the rotated set of image data based upon the set of marker point data and the set of floor point data.

18 Claims, 6 Drawing Sheets

SYSTEM AND METHOD FOR AUTOMATIC CONTAINER CONFIGURATION USING FIDUCIAL MARKERS

BACKGROUND

In commercial shipping via airplanes, packages are loaded into containers called ULDs (unit load devices). Many different types of ULDs exist, of which about 20 are commonly used. This poses challenges for high-fidelity container analytics, because any algorithm must be generic enough to work with any ULD, but specific enough to provide accurate metrics for each specific container. Notably, prior to obtaining or performing most analytics, the analytics system must localize the ULD at the load point by identifying the position of the ULD within the system's field of view (FOV). Localization is critical to not only properly calculate loading metrics, but to also properly calibrate the system to the load point. Correspondingly, a major point of emphasis in the transportation/shipping industry is performing high fidelity localization at the load point of such containers.

Localizing ULDs consists, in part, of determining exact rotation and clipping parameters of the captured data with respect to the capturing sensor. However, determining these parameters is a substantial challenge for traditional systems, because many ULDs feature shiny, highly-reflective metal (e.g., airplane-grade aluminum) surfaces. As a result, traditional sensors collecting three-dimensional (3D) data of an empty container as part of the localization process may receive no usable data. Instead, traditional systems may perform analytics using 3D data lacking walls and/or floors, and that erroneously represents the orientation of the ULD. These problems are further frustrated in traditional systems because manual parameter detection is incredibly time consuming, and data from the container alone is generally insufficient. Accordingly, various problems generally arise regarding how to properly determine rotation and clipping parameters for a ULD automatically, efficiently, and accurately at the loading point of the ULD.

Thus, there is a need for systems and methods to automatically configure ULDs that allow for fast, efficient, and accurate real-time rotation and clipping parameter assessments for ULD load point analytics.

SUMMARY

In an embodiment, the present invention is a method for determining rotation and clipping parameters for images of unit load devices (ULDs). The method includes capturing a set of image data featuring a ULD; locating a fiducial marker proximate to the ULD within the set of image data; cropping the set of image data, based upon the located fiducial marker, to generate a set of marker point data and a set of floor point data; rotating the set of image data based upon the set of marker point data and the set of floor point data; and clipping the rotated set of image data based upon the set of marker point data and the set of floor point data.

In a variation of this embodiment, the set of image data featuring the ULD comprises (i) a three-dimensional (3D) depth image that includes 3D point data and (ii) a grayscale image that includes two-dimensional (2D) point data and that is depth-aligned with the 3D depth image. Moreover, in another variation of this embodiment, locating the fiducial marker within the set of image data further comprises locating the fiducial marker within the 2D point data, and the method further comprises: projecting coordinates of the 2D point data corresponding to the fiducial marker onto the 3D point data; and cropping the 3D point data to generate the set of marker point data and the set of floor point data. Further in these variations, projecting coordinates of the 2D point data corresponding to the fiducial marker onto the 3D point data further comprises: locating, using a first set of edge values corresponding to the set of marker point data, a second set of edge values corresponding to the set of floor point data.

In yet another variation of this embodiment, the set of image data featuring the ULD comprises at least a three-dimensional (3D) depth image that includes 3D point data, and the method further comprises: fitting a first plane to the set of marker data points and a second plane to the set of floor data points; calculating a pitch angle of the 3D point data relative to the camera based upon the set of floor point data; and calculating a yaw angle of the 3D point data relative to the camera based upon the set of marker point data. Further in this variation, rotating the set of image data based upon the set of marker point data and the set of floor point data further comprises: rotating, based upon the set of floor point data, the set of image data on a horizontal axis by the pitch angle; and rotating, based upon the set of marker point data, the set of image data on a vertical axis by the yaw angle.

In still another variation of this embodiment, the method further comprises estimating (i) a set of depth clipping coordinates for the rotated set of image data based upon the set of marker point data, (ii) a set of longitudinal clipping coordinates for the rotated set of image data based upon the set of floor point data, and (iii) a set of lateral clipping coordinates for the rotated set of image data based upon the set of marker point data. Further in these variations, estimating the set of depth clipping coordinates further comprises calculating a statistical depth value of the set of marker point data that is adjusted by a depth displacement of the fiducial marker within the ULD, estimating the set of longitudinal clipping coordinates further comprises calculating a statistical height value of the set of floor point data, and estimating the set of lateral clipping coordinates further comprises calculating a first set of extreme lateral coordinates corresponding to the ULD based upon a second set of extreme lateral coordinates corresponding to the set of marker point data.

In yet another variation of this embodiment, the set of image data featuring the ULD comprises (i) a three-dimensional (3D) depth image and (ii) a red-green-blue (RGB) image, and wherein the method further comprises: aligning the RGB image with the 3D depth image. Moreover, in other variations of this embodiment, the fiducial marker further comprises a plurality of fiducial markers proximate to the ULD.

In still another variation of this embodiment, the method further comprises training a machine learning model using (i) a plurality of sets of image data, each set of image data featuring a respective ULD, (ii) a plurality of sets of marker point data, each set of marker point data corresponding to a respective set of image data, (iii) a plurality of sets of floor point data, each set of floor point data corresponding to a respective set of image data, and (iv) a plurality of sets of rotated and clipped image data; and applying the machine learning model to the set of image data featuring the ULD to locate the fiducial marker within the set of image data, crop the set of image data, rotate the set of image data, and clip the rotated set of image data.

In another embodiment, the present invention is a system for determining rotation and clipping parameters for images of unit load devices (ULDs). The system includes a housing, an imaging assembly, one or more processors, and a non-transitory computer-readable memory. The imaging assembly is at least partially within the housing and configured to capture a set of image data featuring the ULD. The non-transitory computer-readable memory is coupled to the imaging assembly and the one or more processors. The memory stores instructions thereon that, when executed by the one or more processors, cause the one or more processors to: locate a fiducial marker proximate to the ULD within the set of image data; crop the set of image data, based upon the located fiducial marker, to generate a set of marker point data and a set of floor point data; rotate the set of image data based upon the set of marker point data and the set of floor point data; and clip the rotated set of image data based upon the set of marker point data and the set of floor point data.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
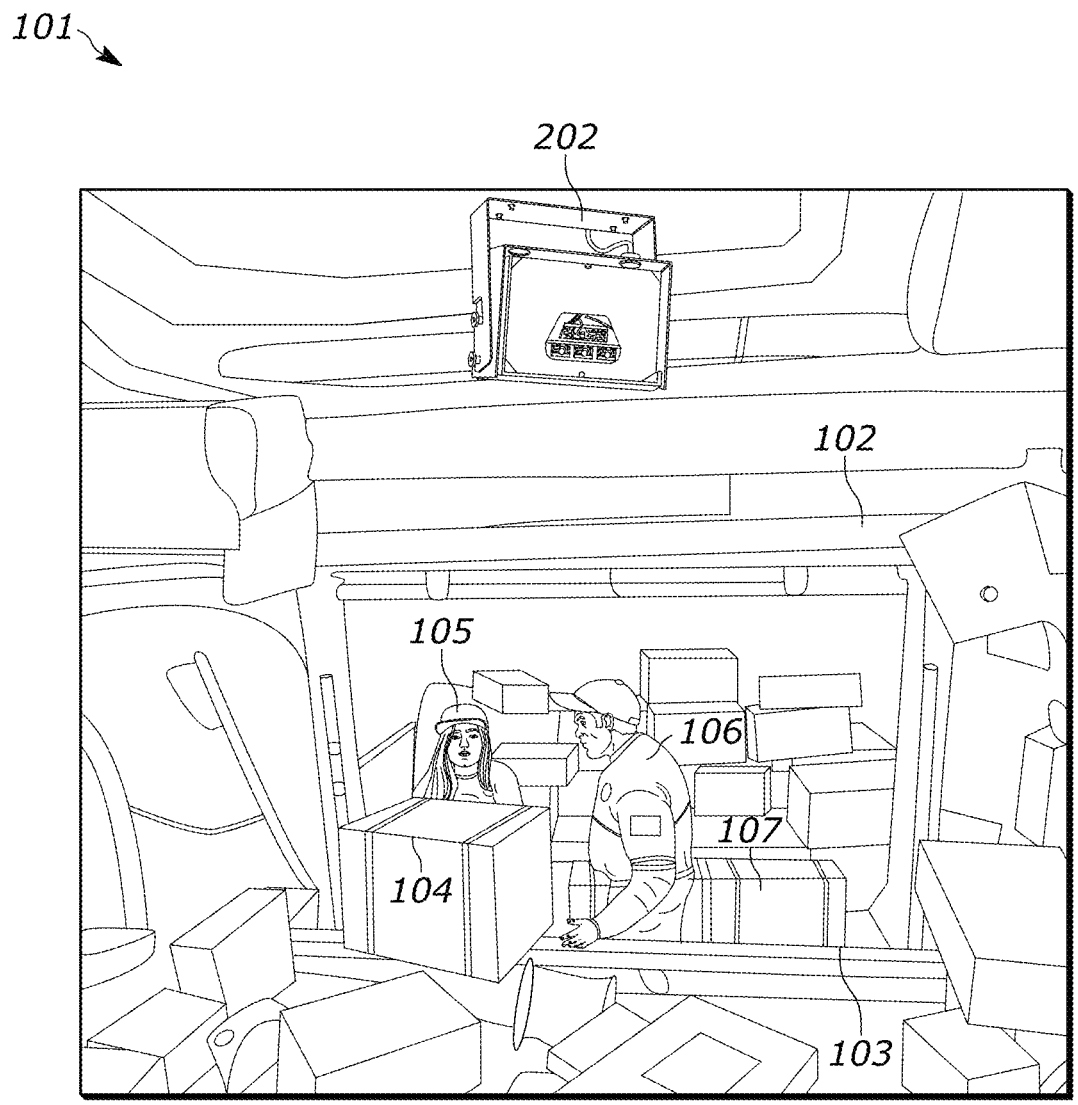
FIG. 1 is a perspective view, as seen from above, of a load point featuring a load monitoring unit (LMU) within a loading facility, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, shipping companies seek to accurately and efficiently detail the load status of each container for which they are responsible. Many companies incorporate imaging systems to provide this analysis (e.g., load monitoring units (LMUs)). However, these traditional imaging systems suffer from a number of drawbacks, such as being unable to effectively localize containers within the system's field of view (FOV).

The methods/systems of the present disclosure provide solutions to the localization problems associated with the traditional imaging systems. Namely, the methods/systems of the present disclosure alleviate problems associated with rotation and clipping parameter determination in traditional imaging systems used for ULD localization. For example, a method of the present disclosure includes capturing a set of image data featuring a ULD; locating a fiducial marker proximate to the ULD within the set of image data; cropping the set of image data, based upon the located fiducial marker, to generate a set of marker point data and a set of floor point data; rotating the set of image data based upon the set of marker point data and the set of floor point data; and clipping the rotated set of image data based upon the set of marker point data and the set of floor point data.

As used herein, the term "container" shall refer to any container transportable by at least one of a vehicle, a train, a marine vessel, and airplane, and configured to store transportable goods such as boxed and/or unboxed items and/or other types of freight. Accordingly, an example of a container includes an enclosed container fixedly attached to a platform with wheels and a hitch for towing by a powered vehicle. An example of a container also includes an enclosed container removably attached to a platform with wheels and a hitch for towing by a powered vehicle. An example of a container also includes an enclosure that is fixedly attached to a frame of a powered vehicle, such as the case may be with a delivery truck, box truck, etc. As such, while the exemplary embodiment(s) described below may appear to reference one kind of a container, the scope of the invention shall extend to other kinds of container, as defined above.

FIG. 1 is a perspective view, as seen from above, of a load point 101 within a loading facility that depicts a load monitoring unit (LMU) 202 having a 3D camera (e.g., a 3D-depth camera) oriented in a direction to capture 3D image data of a shipping container 102 (also referenced herein as a "ULD" and/or a "unit load device"), in accordance with example embodiments herein. As depicted, the shipping container 102 has a shipping container type of "AMJ." Generally, a shipping container is selected from one of several differently dimensioned containers. In various embodiments, shipping containers may comprise any type of unit load device (ULD). For example, a shipping container type may be of any ULD type, including, for example, any of an AMJ type, an AAD type, an AKE type, an AYY type, a SAA type, and APE type, or an AQF type. For ULD shipping containers, the first letter (e.g., "A" for "Certified aircraft container") indicates a specific type of ULD container, such as certified, thermal, etc., the second letter represents base size in terms of dimensions (e.g., "M" for 96×125 inch), and the third letter represents a side contour size and shape (e.g., "J" for a cube shaped ULD container having a diagonal sloping roof portion on one side only).

More generally, however, a shipping container may be any aircraft-based shipping container.

The load point 101 may be a predefined search space determined based on the shipping container 102 size, dimensions, or otherwise configuration and/or the area in which the shipping area is localized. For example, in one embodiment, the predefined search space may be determined based on ULD type, shape, or position within a general area. As shown in FIG. 1, for example, the predefined search space is determined based on the size and dimensions of the shipping container 102 which is of type AMJ. In general, load point 101 is defined so as to completely (or at least partially) include or image the shipping container 102. The load point 101 may further include a frontal area 103 that generally defines a front position of the predefined search space and/or the shipping container 102.

FIG. 1 additionally depicts, within the load point 101, personnel or loaders 105 and 106 that load packages 104 and 107 into the shipping container 102. In the embodiment of FIG. 1, the shipping container 102 is being loaded by the loaders 105 with the packages 104 and 107 during a loading session. The loading session includes loading a set or group of identified packages into the shipping container 102. The loaders 105 and 106 and the packages 104 and 107, by movement through the load point 101, may generally cause occlusion and interference with the LMU 202 (as discussed for FIG. 2) capturing 3D image data, over time, of the shipping container 102. Thus, accurately localizing the container 102 within the load point 101 is critical to ensure that improper localization does not further complicate the imaging difficulties posed by occlusion and interference during normal operations of a loading session.

Figure 2:
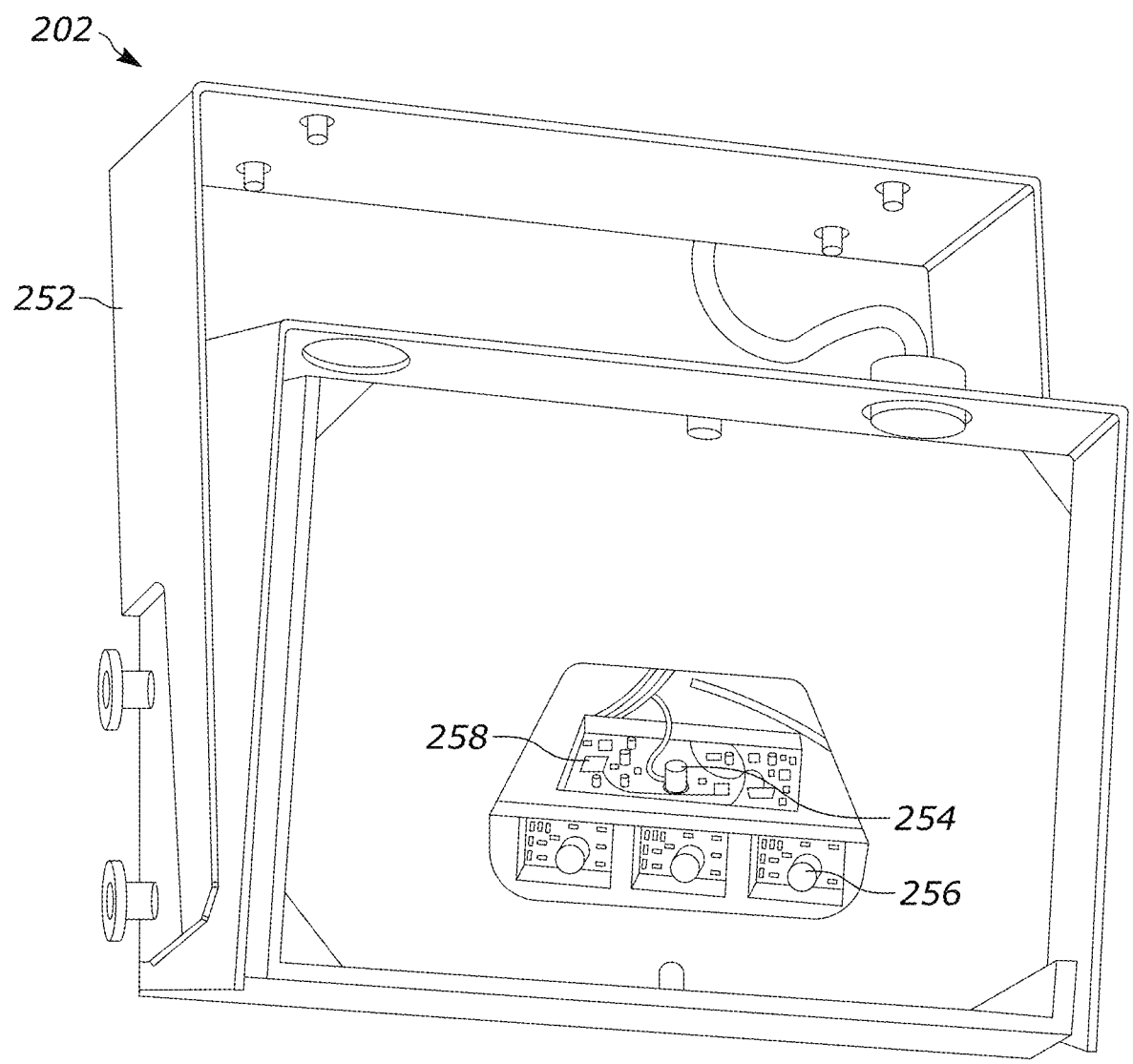
FIG. 2 is a perspective view of the LMU of FIG. 1, in accordance with embodiments described herein.

FIG. 2 is a perspective view of the LMU 202 of FIG. 1, in accordance with example embodiments herein. In various embodiments, the LMU 202 is a mountable device. Generally, an LMU (e.g., LMU 202) comprises camera(s) and a processing board, and is configured to capture data of a loading scene (e.g., a scene including space 101). The LMU 202 may run container fullness estimation and other advanced analytical algorithms.

The LMU 202 may include a mounting bracket 252 for orienting or otherwise positioning the LMU 202 within a loading facility associated with the load point 101, as described herein. The LMU 202 may further include one or more processors and one or more memories for processing image data as described herein. For example, the LMU 202 may include flash memory used for determining, storing, or otherwise processing the imaging data/datasets and/or post-scanning data. In addition, the LMU 202 may further include a network interface to enable communication with other devices.

The LMU 202 may include a 3D camera 254 (also referenced herein as a "Time-of-Flight (ToF) camera") for capturing, sensing, and/or scanning 3D image data/datasets. For example, in some embodiments, the 3D camera 254 may include an Infra-Red (IR) projector and a related IR camera. In such embodiments, the IR projector projects a pattern of IR light or beams onto an object or surface, which, in various embodiments herein, may include surfaces or areas of a predefined search space (e.g., load point 101) or objects within the predefined search area, such as boxes or packages (e.g., packages 104 and 107) and the storage container 102. The IR light or beams may be distributed on the object or surface in a pattern of dots or points by the IR projector, which may be sensed or scanned by the IR camera. A depth-detection app, such as a depth-detection app executing on the one or more processors or memories of the LMU 202, can determine, based on the pattern of dots or points, various depth values, for example, depth values of the predefined search area. For example, a near-depth object (e.g., nearby boxes, packages, etc.) may be determined where the dots or points are dense, and distant-depth objects (e.g., far boxes, packages, etc.) may be determined where the points are more spread out. The various depth values may be used by the depth-detection app and/or the LMU 202 to generate a depth map. The depth map may represent a 3D image of, or contain 3D image data of, the objects or surfaces that were sensed or scanned by the 3D camera 254, for example, the load point 101 and any objects, areas, or surfaces therein. The 3D camera 254 may also be configured to capture other sets of image data in addition to the 3D image data, such as grayscale image data.

The LMU 202 may further include a photo-realistic camera 256 for capturing, sensing, or scanning 2D image data. The photo-realistic camera 256 may be an RGB (red, green, blue) based camera for capturing 2D images having RGB-based pixel data. In some embodiments, the photo-realistic camera 256 may capture 2D images, and related 2D image data, at the same or similar point in time as the 3D camera 254 such that the LMU 202 can have both sets of 3D image data and 2D image data available for a particular surface, object, area, and/or scene at the same or similar instance in time. Further in these embodiments, the LMU 202 may include a depth alignment module (e.g., as part of the depth detection app) to depth-align 3D image data with 2D image data. In other embodiments, the 3D camera 254 and the photo-realistic camera 256 may be a single imaging apparatus configured to capture 3D depth image data simultaneously with 2D image data. Consequently, in these embodiments, the captured 2D images and the corresponding 2D image data may be depth-aligned with the 3D images and 3D image data.

The LMU 202 may also include a processing board 258 configured to, for example, perform container fullness estimation and other advanced analytical algorithms based on images captured by the cameras 254, 256. Generally, the processing board 258 may include one or more processors and one or more computer memories for storing image data, and/or for executing apps that perform analytics or other functions as described herein. The processing board 258 may also include transceivers and/or other components configured to communicate with external devices/servers. The processing board 258 may thus transmit and/or receive data or other signals to/from external devices/servers before, during, and/or after performing the analytical algorithms described herein.

In various embodiments, and as shown in FIG. 1, the LMU 202 may be mounted within a loading facility and oriented in the direction of the loading point 101 to capture 3D and/or 2D image data of the shipping container 102. For example, as shown in FIG. 1, the LMU 202 may be oriented such that the 3D and 2D cameras of the LMU 202 may capture 3D image data of the shipping container 102, e.g., where the LMU 202 may scan or sense the walls, floor, ceiling, packages, or other objects or surfaces within the load point 101 to determine the 3D and 2D image data. The image data may be processed by the processing board 258 of the LMU 202 (or, in some embodiments, one or more remote processors and/or memories of a server) to implement analysis, functions, such as graphical or imaging analytics, as described by the one or more various flowcharts, block diagrams, methods, functions, or various embodiments herein. It should be noted that the LMU 202 may capture 3D and/or 2D image data/datasets of a variety of loading facilities or other areas, such that additional loading facilities or areas (e.g., warehouses, etc.) in addition to the predefined search spaces (e.g., load point 101) are contemplated herein.

In some embodiments, for example, the LMU 202 may process the 3D and 2D image data/datasets, as scanned or sensed from the 3D camera 254 and the photo-realistic camera 256, for use by other devices (e.g., an external server). For example, the processing board 258 of the LMU 202 may process the image data or datasets captured, scanned, or sensed from the load point 101. The processing of the image data may generate post-scanning data that may include metadata, simplified data, normalized data, result data, status data, or alert data as determined from the original scanned or sensed image data. In some embodiments, the image data and/or the post-scanning data may be sent to a client device/client application, such as a container feature assessment app that may be, for example, installed and executing on a client device, for viewing, manipulation, or otherwise interaction. In other embodiments, the image data and/or the post-scanning data may be sent to a server for storage or for further manipulation. For example, the image data and/or the post-scanning data may be sent to a server. In such embodiments, the server or servers may generate post-scanning data that may include metadata, simplified data, normalized data, result data, status data, or alert data as determined from the original scanned or sensed image data provided by the LMU 202. As described herein, the server or other centralized processing unit and/or storage may store such data, and may also send the image data and/or the post-scanning data to a dashboard app, or other app, implemented on a client device, such as the container feature assessment app implemented on a client device.

Figure 3:
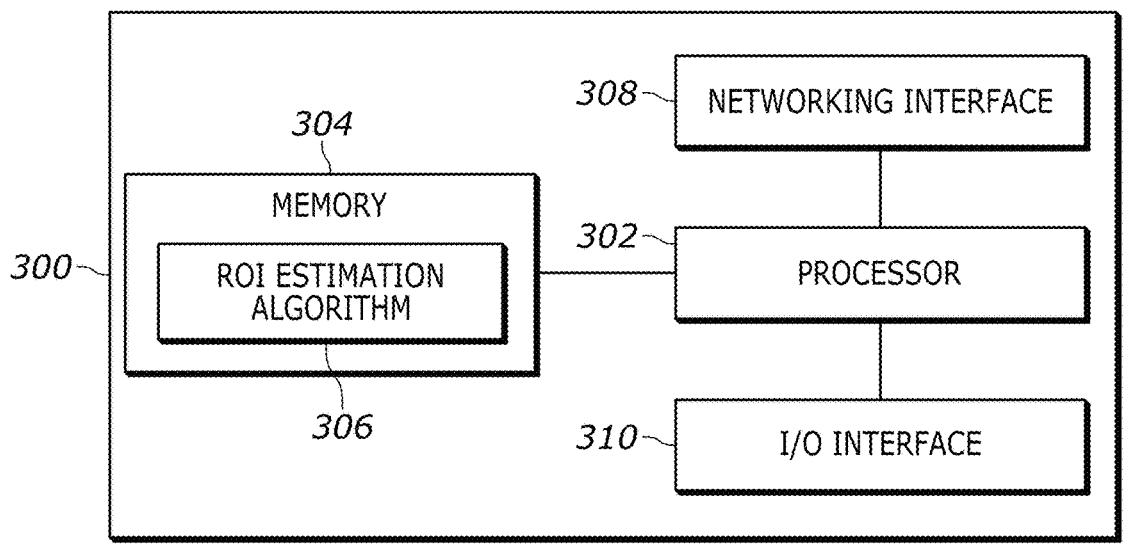
FIG. 3 is a block diagram of an example logic circuit for implementing example methods and/or operations described herein.

FIG. 3 is a block diagram representative of an example logic circuit capable of implementing, for example, one or more components of the example TMU 202 of FIG. 2 or, more specifically, the example processing board 258 of FIG. 2. The example logic circuit of FIG. 3 is a processing platform 300 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 300 of FIG. 3 includes a processor 302 such as, for example, one or more microprocessors, controllers, and/or any suitable type of processor. The example processing platform 300 of FIG. 3 includes memory (e.g., volatile memory, non-volatile memory) 304 accessible by the processor 302 (e.g., via a memory controller). The example processor 302 interacts with the memory 304 to obtain, for example, machine-readable instructions stored in the memory 304 corresponding to, for example, the operations represented by the flowcharts of this disclosure. The memory 304 also includes a region of interest (ROI) estimation algorithm 306 that is accessible by the example processor 302. The ROI estimation algorithm 306 may comprise rule-based instructions, an artificial intelligence (AI) and/or machine learning-based model, and/or any other suitable algorithm architecture or combination thereof configured to determine rotation and clipping parameters for images of a ULD (e.g., shipping container 102). For example, the example processor 302 may access the memory 304 to execute the ROI estimation algorithm 306 when the LMU 202 captures a set of image data featuring a ULD. Additionally or alternatively, machine-readable instructions corresponding to the example operations described herein may be stored on one or more removable media (e.g., a compact disc, a digital versatile disc, removable flash memory, etc.) that may be coupled to the processing platform 300 to provide access to the machine-readable instructions stored thereon.

The example processing platform 300 of FIG. 3 also includes a network interface 308 to enable communication with other machines via, for example, one or more networks. The example network interface 308 includes any suitable type of communication interface(s) (e.g., wired and/or wireless interfaces) configured to operate in accordance with any suitable protocol(s) (e.g., Ethernet for wired communications and/or IEEE 802.11 for wireless communications).

The example, processing platform 300 of FIG. 3 also includes input/output (I/O) interfaces 310 to enable receipt of user input and communication of output data to the user. Such user input and communication may include, for example, any number of keyboards, mice, USB drives, optical drives, screens, touchscreens, etc.

Figure 4:
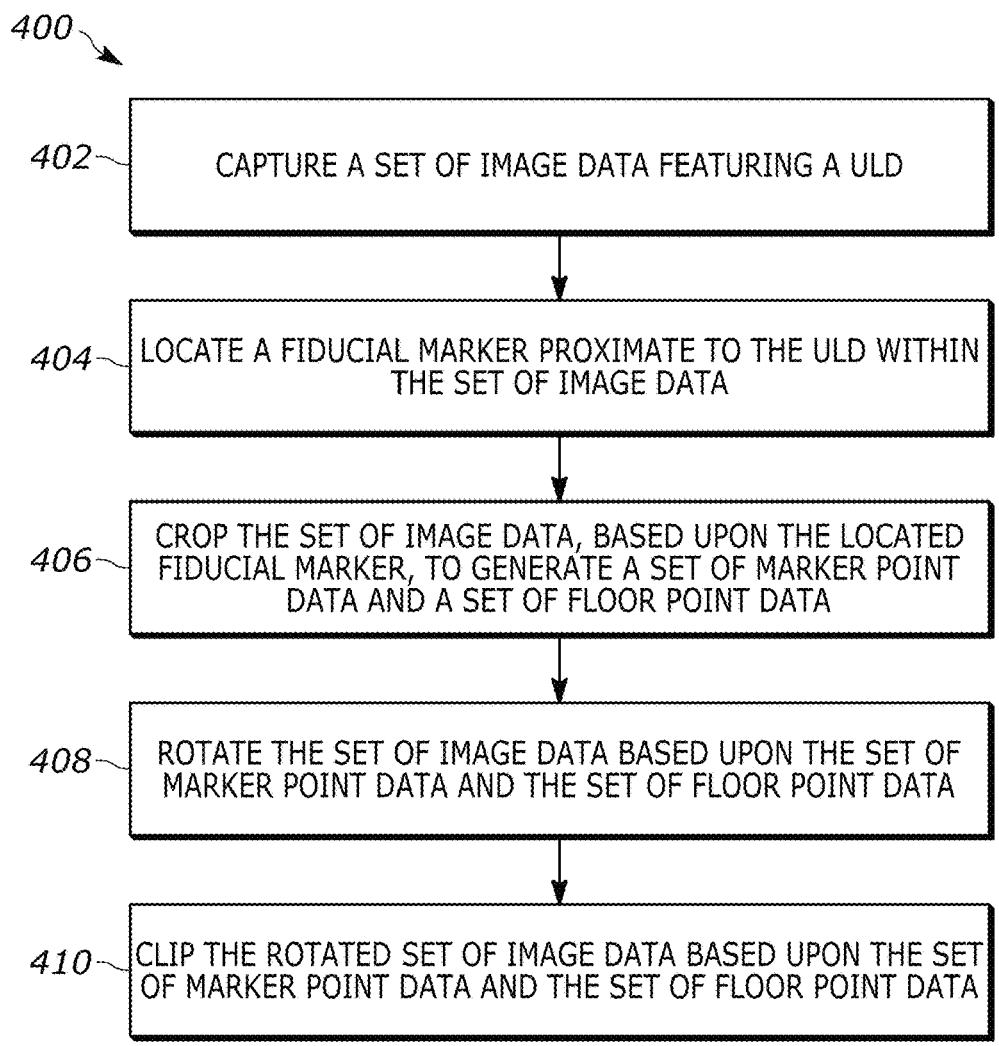
FIG. 4 is a flowchart representative of a method for determining rotation and clipping parameters for images of ULDs, in accordance with embodiments described herein.

FIG. 4 is a flowchart representative of a method 400 for determining rotation and clipping parameters for images of ULDs, in accordance with embodiments described herein. Method 400 describes various methods for determining rotation and clipping parameters for images of ULDs, and embodiments of the method 400 are discussed below in context with reference to FIGS. 5, 6, and 7. Generally speaking, and as mentioned above, the method 400 for determining rotation and clipping parameters for images of ULDs utilizes fiducial markers located in image data featuring a ULD within a load point (e.g., load point 101) to determine the rotation and clipping parameters associated with images of ULDs placed at the load point. The rotation and clipping parameters may include angular values (e.g., pitch and yaw angles) and Cartesian coordinate values representing vertical, lateral, and depth position values of a ROI containing the ULD within the image representing the load point. It is to be appreciated that any suitable coordinate system and/or any other measurement metric or combinations thereof may be used to represent the rotation and clipping parameters associated with images of ULDs placed at the load point. Further, it is to be understood that any of the steps of the method 400 may be performed by, for example, the LMU 202, the ToF camera 254, the processor 302, the ROI estimation algorithm 306, and/or any other suitable components or combinations thereof discussed herein.

At block 402, the method 400 includes capturing a set of image data featuring a ULD. Broadly, the set of image data may represent the load point, such that the set of image data may feature the ULD when the ULD is located within the load point (e.g., during a loading session). The LMU 202 of FIG. 2 may automatically capture or receive a signal from an operator instructing the LMU 202 to capture a set of image data in response to the presence of a ULD in the load point (e.g., load point 101). The LMU 202 may capture image data of the ULD using any number of cameras included in the LMU 202, such as the ToF camera 254 and/or the photo-realistic camera 256.

More specifically, the LMU 202 may capture the set of image data in response to a signal from an operator attempting to initially configure the LMU 202 to accurately and consistently capture images of ULDs at the load point for container analytics purposes. For example, the LMU 202 may have been recently installed at the load point, and the operator may attempt to initially configure the LMU 202 by capturing a set of image data with the LMU 202, and proceeding to analyze (e.g., via the ROI estimation algorithm 306) the set of image data in accordance with the method 400, as further described herein.

Figure 5:
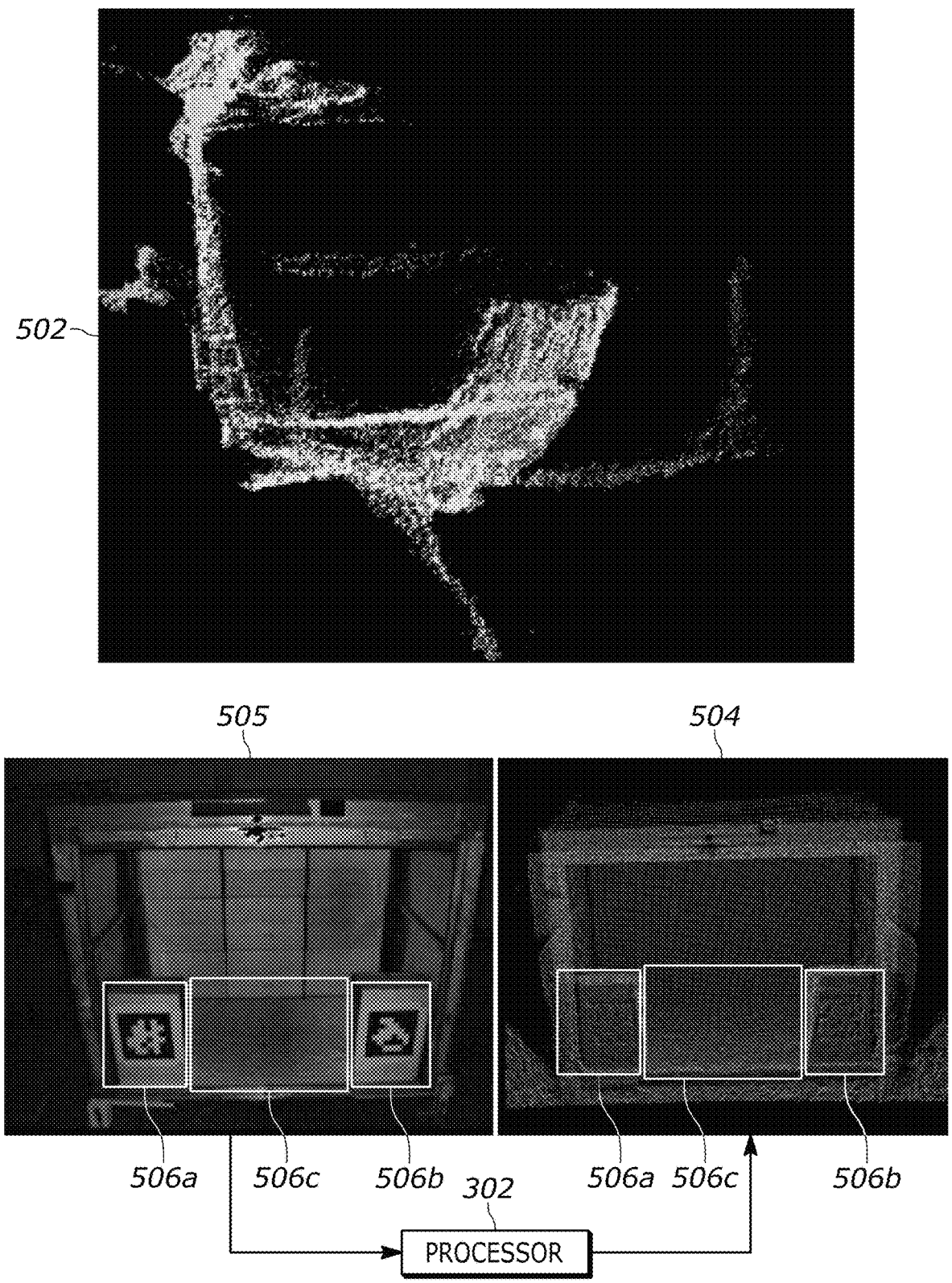
FIG. 5 illustrates example image captures of the load point of the loading facility of FIG. 1 and an example coordinate projection from an example infrared image to an example 3D point cloud image, used to facilitate example methods and/or operations described herein.

In reference to FIG. 5, the LMU 202 may capture, as part of the set of image data, a set of 3D point data 502 representing a ULD from a side perspective using, e.g., the ToF camera 254. As illustrated in FIG. 5, the set of 3D point data 502 provides a very sparse approximation of the ULD within the FOV of the ToF camera 254. As previously mentioned, the material(s) used to construct most typical ULDs (e.g., airplane-grade aluminum) results in a high reflection rate of most incident signals. The ToF camera 254 may utilize IR projection to calculate depth values corresponding to the IR signals received back at the ToF camera 254. The projected IR beams/pulses may interact with the curved, metal surfaces of many common ULDs in such a manner as to generate distorted and/or otherwise obscured depth values. As illustrated, the 3D point data 502 features a floor plane that is angled downwards, and a missing back wall. More generally, the obscured/erroneous depth values do not accurately correspond to the location of the ULD within the load point. Accordingly, the 3D data present in the set of 3D point data 502 is virtually unusable for container analytics purposes, particularly localization.

Unlike the 3D depth image 504, the grayscale image 505 may be, for example, an ambient image or amplitude image captured by the ToF camera 254. Consequently, the grayscale image 505 may represent an amplitude of the signals captured by the ToF camera 254 in other images (e.g., the 3D depth image 504). The grayscale image 505 may thus represent a more accurate representation of the load point because the data comprising the grayscale image 505 remains relatively unaffected by the signal distortion associated with the reflective, metal surfaces of many ULDs. As illustrated, the grayscale image 505 features two fiducial markers 506a, 506b and an unobscured floor plane 506c.

In embodiments, the set of image data featuring the ULD may comprise (i) a 3D depth image 504 that includes 3D point data and (ii) a grayscale image 505 that includes two-dimensional (2D) point data and that is depth-aligned with the 3D depth image 504. The LMU 202 may capture both images using, for example, the ToF camera 254. In this manner, the grayscale image 505 will automatically be aligned with the 3D depth image 504 because both images were captured by the ToF camera 254. However, it is to be understood that the LMU 202 may capture the 3D depth image 504 using the ToF camera 254, and the grayscale image 505, for example, using the photo-realistic camera 256 and/or any other combination of cameras. In these embodiments, the LMU 202 may also include a depth alignment module (e.g., as part of the depth detection app) to depth-align the 3D depth image 504 with the grayscale image 505. Moreover, the LMU 202 may capture the 3D depth image 504 and the grayscale image 505 from a frontal perspective of the ULD, in contrast to the side perspective of the ULD illustrated by the set of 3D point data 502.

In other embodiments, the set of image data featuring the ULD includes (i) a 3D depth image and (ii) a red-green-blue (RGB) image. The LMU 202 may capture the 3D depth image using the ToF camera 254, and may capture the RGB image using, for example, the photo-realistic camera 256. In practice, the ToF camera 254 and the photo-realistic camera 256 may be positioned at different locations within the LMU 202, such that the resulting images (three-dimensional depth image and RGB image, respectively) may need to be aligned. The LMU 202 may align (e.g., via a depth alignment module) the images such that each pixel representing an object included in the RGB image corresponds to a depth value from a pixel representing the object in the 3D image.

At block 404, the method 400 includes locating a fiducial marker proximate to the ULD within the set of image data. Generally, the fiducial markers 506a, 506b are patterns printed and/or otherwise displayed near a front edge of the ULD that are used as points of reference by the LMU 202 (e.g., via the ROI estimation algorithm 306) to determine the rotation and clipping parameters associated with images of the ULD. More specifically, the fiducial markers 506a, 506b may be placed at a fixed distance from the front edge(s) and the side edges of the ULD. While illustrated in FIG. 5 as two fiducial markers, it will be appreciated that any suitable number of fiducial markers may be placed within and/or near the ULD. In some embodiments, the fiducial marker(s) may comprise a plurality of fiducial markers that are proximate to the ULD.

In any event, the ROI estimation algorithm 306 may locate the fiducial markers 506a, 506b by determining the coordinate values within the set of image data that are associated with each marker 506a, 506b. The ROI estimation algorithm 306 may then use these coordinate values as reference coordinates within the set of image data during the techniques described herein. Typically, the ROI estimation algorithm 306 may locate the fiducial markers 506a, 506b within the grayscale image 505, due to the higher fidelity image characteristics of the grayscale image 505 compared to the 3D depth image 504. However, prior to determining coordinate values associated with the fiducial markers 506a, 506b, the ROI estimation algorithm 306 may apply various filters and/or filtering techniques (e.g., CLAHE filtering techniques, etc.) to reduce the noise and generally enhance the quality of the grayscale image 505. The ROI estimation algorithm 306 may then locate the fiducial markers 506a, 506b within the grayscale image 505 using any suitable image analysis/recognition technique.

When the ROI estimation algorithm 306 locates the fiducial markers 506a, 506b, the LMU 202 may further locate the unobscured floor plane 506c and project the 2D coordinate values for the fiducial markers 506a, 506b and the unobscured floor plane 506c from the grayscale image 505 to the 3D depth image 504. For example, the ROI estimation algorithm 306 may project the 2D coordinate values corresponding to the exterior corners of the fiducial marker(s) and the floor plane (e.g., 2D coordinate values for the four corners of fiducial markers 506a, 506b), 2D coordinate values corresponding to the exterior edges of the fiducial marker(s) and the floor plane, all 2D coordinate values corresponding to the fiducial marker(s) and the floor plane, an average 2D coordinate value for one or more edges of the fiducial marker(s) and the floor plane, and/or any other suitable quantity, orientation, statistical representation, and/or otherwise indication of the coordinate value(s) corresponding to the fiducial marker(s) and the floor plane or combinations thereof.

In embodiments, the ROI estimation algorithm 306 may locate the unobscured floor plane 506c by analyzing a set of edge values corresponding to the fiducial markers 506a, 506b. The ROI estimation algorithm 306 may retrieve (e.g., from memory 304) predetermined gap/distance values representing the distance from edge values of the fiducial markers 506a, 506b to edge values of the unobscured floor plane 506c. The ROI estimation algorithm 306 may then adjust the coordinates of the edge values of the fiducial markers 506a, 506b by the predetermined gap/distance values to determine the coordinates of the edge values of the unobscured floor plane 506c.

Additionally or alternatively, the ROI estimation algorithm 306 may apply a statistical adjustment factor to the edge values of the fiducial markers 506a, 506b to determine the edge values of the unobscured floor plane 506c. For example, a predetermined gap/distance value may indicate that an edge of the unobscured floor plane 506c may begin ten pixels to the left/right of an edge associated with a fiducial marker 506a, 506b. A statistical adjustment factor may indicate, for example, that the coordinate values corresponding to an edge of the unobscured floor plane 506c are approximately twelve pixels to the left/right of an average pixel coordinate value corresponding to an edge of the fiducial marker 506a, 506b. The LMU 202 may receive a predetermined gap/distance value and/or a statistical adjustment factor prior to capturing image data (e.g., block 402), for example, via a network interface (e.g., network interface 308) based on an input received from an operator or a predetermined gap/distance value and/or a statistical adjustment factor retrieved from an external device (e.g., external server).

For example, assume that the grayscale image 505 represents the FOV of the LMU 202 cameras, and further assume that the grayscale image 505 may be overlaid with a coordinate mapping (e.g., a Cartesian coordinate mapping). The coordinate mapping may include a series of 100 equally spaced divisions in a lateral and a vertical direction that divide the grayscale image 505 into a set of 10,000 equal area regions. Moreover, each of the 100 equally spaced divisions may include a numerical identifier, and the numerical identifiers may monotonically increase as the divisions extend further away in the respective directions. Thus, the coordinate mapping may designate the bottom left corner of the grayscale image 505 as the origin (e.g., coordinates (0,0)), the top left corner of the grayscale image 505 having coordinates (0, 100), the bottom right corner of the grayscale image 505 having coordinates (100,0), and the top right corner of the grayscale image 505 having coordinates (100, 100).

Further in this example, assume that the 3D depth image 504 also represents the FOV of the LMU 202 cameras, and that the 3D depth image 504 may also be overlaid with the coordinate mapping, as described with respect to the grayscale image 502. The 3D depth image 504 may also include a depth component, such that the coordinates describing any particular point (e.g., pixel) in the 3D depth image 504 may have a lateral component, a vertical component, and a depth component. Thus, the coordinate mapping of any particular pixel in the 3D depth image 504 may be represented as (x, y, z), where x is the lateral component, y is the vertical component, and z is the depth component. The depth component for each pixel included in the 3D depth image 504 may describe, for example, a distance of an object represented by the pixel from the LMU 202. The depth component corresponding to a pixel may be represented in feet, inches, meters, and/or any other suitable units, or combinations thereof.

It is to be understood that a particular pixel within the 3D depth image 504 with a coordinate mapping represented as (x, y, z), where x and y represent any suitable coordinate values (as described above) and z represents a depth value, may have a corresponding coordinate mapping (x, y) within the grayscale image 505. When the coordinate mappings for each pixel in the 3D depth image 504 and the grayscale image 505 are aligned in this manner, the images are considered "depth-aligned." Accordingly, when the ROI estimation algorithm 306 identifies a particular pixel within the grayscale image 505 to perform cropping and/or any other suitable analysis with respect to the particular pixel, the ROI estimation algorithm 306 may perform a similar or identical analysis with respect to the particular pixel within the 3D depth image 504. Hence, ensuring that the 3D depth image 504 and the grayscale image 505 (or in embodiments, the RGB image or other suitable image) are depth-aligned is critical to accurately perform a depth-based cropping and/or any other suitable analysis between the 3D depth image 504 and any other suitable two-dimensional image.

In any event, the ROI estimation algorithm 306 may determine that a right edge of the fiducial marker 506a is located at (25, 15-35), a left edge of the fiducial marker 506b is located at (75, 15-35), and the LMU 202 may receive a predetermined gap/distance value indicating that the right/left edge of the unobscured floor plane 506c may begin at (x±10, --) to the right/left of the right/left edge associated with the fiducial markers 506a, 506b. Using the coordinates of the right edge of the fiducial marker 506a and the left edge of the fiducial marker 506b, the ROI estimation algorithm 306 may determine that the right/left edges of the unobscured floor plane 506c begin at (65, --) and (35, --), respectively. Similarly, the LMU 202 may receive a predetermined gap/distance value indicating that the top/bottom edges of the unobscured floor plane 506c may begin at (--, y±10) relative to the top/bottom edges associated with the fiducial markers 506a, 506b, and may determine that the top/bottom edges of the unobscured floor plane 506c begin at (--, 45) and (--, 5), respectively. Combining these ranges, the ROI estimation algorithm 306 may determine 2D coordinates of the unobscured floor plane 506c as defined by a box having corners at coordinates (35, 5), (35, 45), (65, 5), and (65, 45).

As illustrated in FIG. 5, the ROI estimation algorithm 306 (e.g., via processor 302) may project the 2D coordinate values of the fiducial markers 506a, 506b and the unobscured floor plane 506c from the grayscale image 505 onto the 3D depth image 504 to further determine depth values corresponding to the fiducial markers 506a, 506b and the unobscured floor plane 506c. The 3D depth image 405 and the grayscale image 505 are automatically depth-aligned or are depth-aligned by the LMU 202 (e.g., via a depth alignment module), so there may generally be a one-to-one correspondence between the 2D coordinates of the fiducial markers 506a, 506b and the unobscured floor plane 506c extracted from the grayscale image 505 and the corresponding 2D (e.g., vertical and lateral coordinates) coordinates of the fiducial markers 506a, 506b and the unobscured floor plane 506c within the 3D point data of the 3D depth image 504. The ROI estimation algorithm 306 may therefore assume that the 3D point data identified in the 3D depth image 504 as representing the fiducial markers 506a, 506b or the unobscured floor plane 506c includes depth values that similarly represent the fiducial markers 506a, 506b or the unobscured floor plane 506c.

Figure 6:
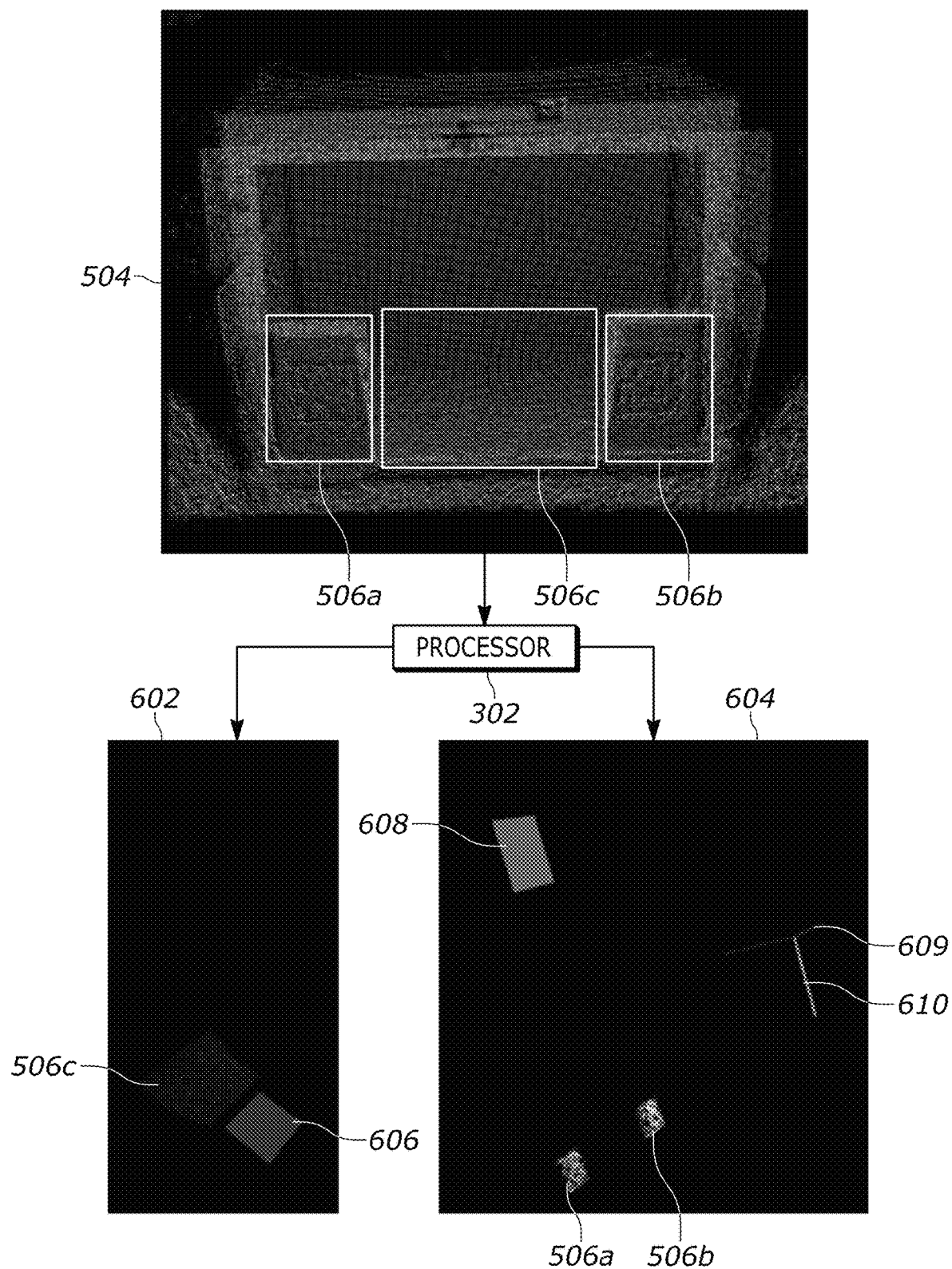
FIG. 6 illustrates example planes fit from the projected coordinates of the example 3D point cloud image of FIG. 5, used to facilitate example methods and/or operations described herein.
Figure 7:
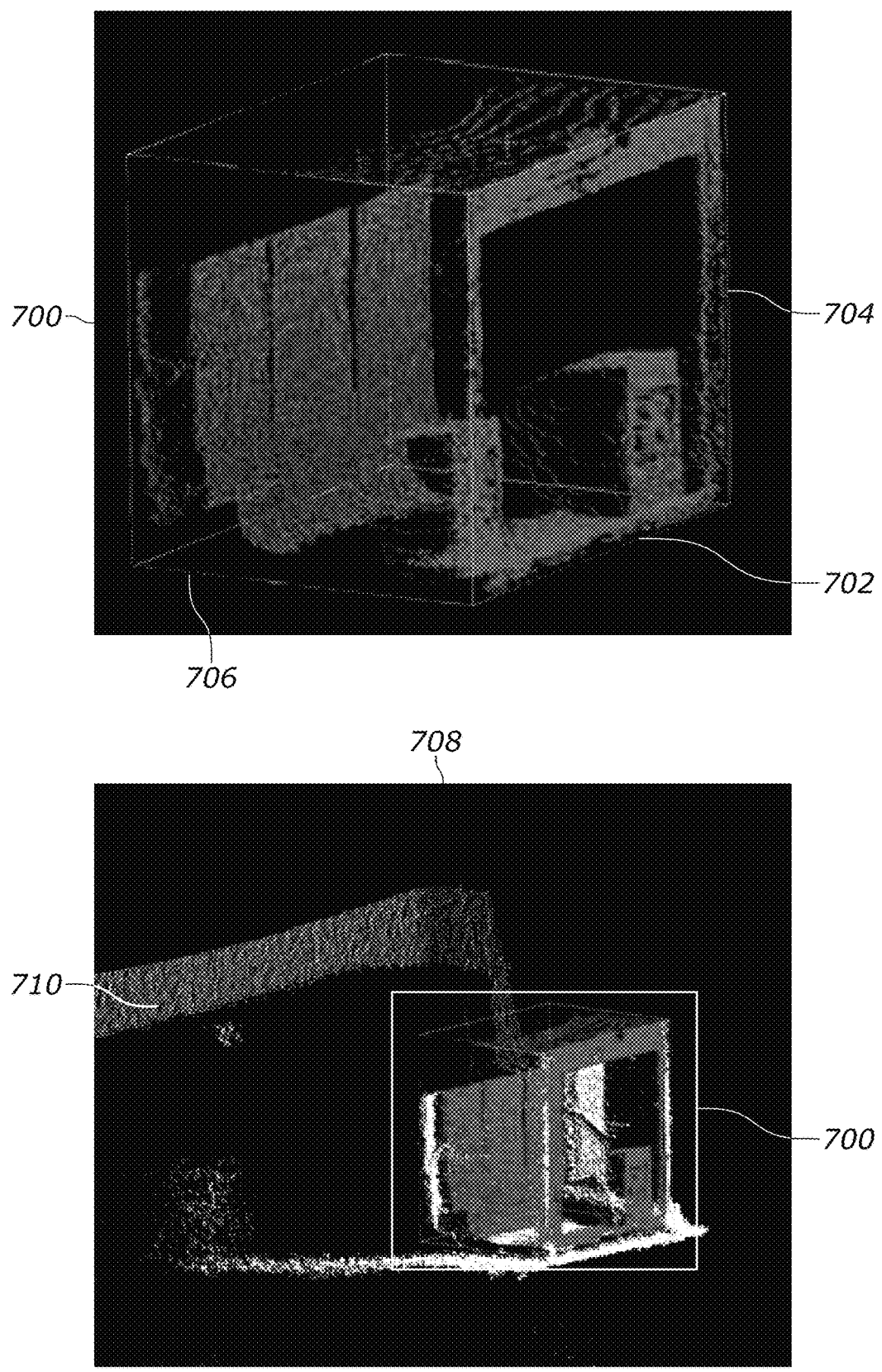
FIG. 7 illustrates example 3D regions of interest (ROIs) generated based on rotation and clipping parameters determined from the example planes of FIG. 6 and the projected coordinates of the example 3D point cloud image of FIG. 5, used to facilitate example methods and/or operations described herein.

At block 406, the method 400 includes cropping the set of image data based upon the located fiducial marker(s) to generate a set of marker point data and a set of floor point data. Generally, as illustrated in FIG. 6, the ROI estimation algorithm 306 may crop the 3D point data identified in the 3D depth image 504 as representing the fiducial markers 506a, 506b to generate the set of marker point data and the 3D point data identified in the 3D depth image 504 as representing the unobscured floor plane 506c to generate the set of floor point data. The ROI estimation algorithm 306 may perform the cropping by removing all 3D point data from the 3D depth image 504 that is not included in the regions of the 3D point data identified in the 3D depth image 504 as representing the fiducial markers 506a, 506b and the unobscured floor plane 506c.

However, in some embodiments, the ROI estimation algorithm 306 may also crop the 3D depth image 504 based on the depth values within the 3D point data representing the fiducial markers 506a, 506b and/or the unobscured floor plane 506c. The LMU 202 may receive a depth threshold indicating that any pixels including a depth value that exceeds the depth threshold should be excluded from the set of marker point data and/or the set of floor point data. The ROI estimation algorithm 306 may then scan each pixel included in the 3D point data representing the fiducial markers 506a, 506b and/or the unobscured floor plane 506c, evaluate the depth value for each pixel, and exclude each pixel in the 3D depth image 504 that has a depth value exceeding the depth threshold. For example, the depth threshold may be twenty meters, such that any pixel in the 3D point data representing the fiducial markers 506a, 506b and/or the unobscured floor plane 506c including a depth component that is greater than twenty (e.g., any pixel with a coordinate mapping (--, --, z>20)) may be cropped out of the set of marker point data and/or the set of floor point data.

With the sets of marker point data and floor point data, the ROI estimation algorithm 306 may accurately calculate the orientation of the floor and fiducial markers with respect to the orientation of the LMU 202, in part, by fitting planes to the data. Accordingly, as illustrated in the floor plane image 602, the ROI estimation algorithm 306 may fit a floor plane 606 to the set of floor point data (e.g., 3D point data representing the unobscured floor plane 506c cropped from the 3D depth image 504). The floor plane 606 may be a planar surface that approximates the orientation of the floor with respect to the orientation of the LMU 202. Similarly, the ROI estimation algorithm 306 may fit a marker plane 608 to the set of marker point data (e.g., 3D point data representing the fiducial markers 506a, 506b cropped from the 3D depth image 504), and the marker plane 608 may be a planar surface that approximates the orientation of the fiducial markers 506a, 506b with respect to the orientation of the LMU 202.

With the floor plane 606 and the marker plane 608, the ROI estimation algorithm 306 may calculate a pitch angle and a yaw angle of the 3D point data that collectively describe an orientation of the 3D point data relative to the orientation of the LMU 202. For example, using the floor plane 606, the ROI estimation algorithm 306 may calculate a pitch angle relative to the orientation of the LMU 202 using the dimensions of the floor plane 606 (e.g., the calculated (x, y, z) coordinates) in conjunction with trigonometric relationships. The pitch angle may generally refer to a difference in orientation between the floor plane 606 and the LMU 202 along a horizontal (e.g., a lateral) axis 609. For example, if the floor plane 606 has a pitch angle of 0° or 180° with respect to the LMU 202, the floor plane 606 would be parallel to the line of sight of the LMU 202 (e.g., minimal light reflection from the floor plane 606 directly to the LMU 202). If the floor plane 606 has a pitch angle of 90° or 270° with respect to the LMU 202, the floor plane 606 would be perpendicular to the line of sight of the LMU 202 (e.g., maximum light reflection from the floor plane 606 directly to the LMU 202.

As another example, the ROI estimation algorithm 306 may calculate a yaw angle relative to the orientation of the LMU 202 using the dimensions of the marker plane 608 (e.g., the calculated (x, y, z) coordinates) in conjunction with trigonometric relationships. The yaw angle may generally refer to a difference in orientation between the marker plane 608 and the LMU 202 along a vertical axis 610. For example, if the marker plane 608 has a yaw angle of 0° with respect to the LMU 202, the marker plane 608 would be perfectly vertically aligned to the line of sight of the LMU 202 (e.g., the ULD featured in the set of image data would be perfectly vertically aligned with the LMU 202). If the marker plane 608 has a yaw angle of 90° with respect to the LMU 202, the marker plane 608 would be parallel to the line of sight of the LMU 202. Thus, including two fiducial markers 506a, 506b when performing the method 400 may allow the ROI estimation algorithm 306 to accurately determine a yaw angle because the fiducial markers 506a, 506b provide two independent, known features of the ULD that should be equidistant from the LMU 202 (e.g., resulting in a 0° yaw angle). If the fiducial markers 506a, 506b are not equidistant from the LMU 202 (e.g., the yaw angle is non-zero), then the ROI estimation algorithm 306 may determine that the ULD is rotated around the vertical axis relative to the LMU 202. For example, the ROI estimation algorithm 306 may determine that the right side of the ULD is slightly closer to the LMU 202 than the left side of the ULD, resulting in a non-zero yaw angle.

At block 408, the method 400 includes rotating the set of image data based upon the set of marker point data and the set of floor point data. Generally, the ROI estimation algorithm 306 may rotate the set of image data by the yaw angle and the pitch angle determined based upon the set of marker point data and the set of floor point data to bring the set of image data into vertical and horizontal alignment with the line of sight of the LMU 202. For example, if the ROI estimation algorithm 306 calculates a yaw angle of five degrees in a clockwise direction based upon the set of marker point data (e.g., the marker plane 608), the ROI estimation algorithm 306 may rotate the entire set of image data five degrees in a counterclockwise direction to bring the set of image data into vertical alignment with the line of sight of the LMU 202. Similarly, if the ROI estimation algorithm 306 calculates a pitch angle of seven degrees in a counterclockwise direction based upon the set of floor point data (e.g., the floor plane 606), the ROI estimation algorithm 306 may rotate the entire set of image data seven degrees in a clockwise direction to bring the set of image data into horizontal alignment with the line of sight of the LMU 202.

At block 410, the method 400 includes clipping the rotated set of image data based upon the set of marker point data and the set of floor point data. Generally, clipping may refer to determining a region within the 3D point data that optimally represents the ULD. The ROI estimation algorithm 306 may calculate/estimate optimal clipping distances (e.g., 3D coordinates, each represented in clipping image 700) for each of the three axes by leveraging previously identified/determined parameters of the set of marker point data and the set of floor point data along with one or more fixed distance(s) associated with each set of data. The fixed distance(s) may be stored locally on the LMU 202 (e.g., via memory 304), and/or the LMU 202 may retrieve/receive the fixed distance(s) via a network interface (e.g., network interface 308) based on an input received from an operator or fixed distance(s) retrieved from an external device (e.g., external server).

In embodiments, the ROI estimation algorithm 306 may estimate (i) a set of depth clipping coordinates (e.g., a frontal clipping distance and a rear clipping distance) for the rotated set of image data based upon the set of marker point data, (ii) a set of longitudinal clipping coordinates (e.g., a top clipping distance and a bottom clipping distance) for the rotated set of image data based upon the set of floor point data, and (iii) a set of lateral clipping coordinates (e.g., side clipping distances) for the rotated set of image data based upon the set of marker point data. Further in these embodiments, estimating the set of depth clipping coordinates may further comprise calculating a statistical depth value of the set of marker point data that is adjusted by a depth displacement of the fiducial marker(s) 506a, 506b within the ULD. Estimating the set of longitudinal clipping coordinates may further comprise calculating a statistical height value of the set of floor point data, and estimating the set of lateral clipping coordinates may further comprise calculating a first set of extreme lateral coordinates corresponding to the ULD based upon a second set of extreme lateral coordinates (e.g., maximum side values) corresponding to the set of marker point data.

As an example, the ROI estimation algorithm 306 may estimate a frontal clipping distance (e.g., Zmin, illustrated in FIG. 7 by element 702) to include 3D point data extending up to, but not exceeding, the front of the ULD by utilizing the set of marker point data. Namely, the ROI estimation algorithm 306 may statistically estimate a depth value associated with the front of the fiducial markers 506a, 506b by, for example, calculating an average depth value for all 3D point data included as part of the set of marker point data. The ROI estimation algorithm 306 may then calculate a minimum depth corresponding to the frontal clipping distance 702 by adjusting the estimated depth value associated with the front of the fiducial markers 506a, 506b by a fixed distance between the fiducial markers and the ULD. If, for example, the fiducial markers 506a, 506b are placed three inches inside the ULD (e.g., the front face of both fiducial markers 506a, 506b are three inches from the front edge of the ULD interior), then the ROI estimation algorithm 306 may subtract three inches from the estimated depth value associated with the front of the fiducial markers 506a, 506b to estimate the frontal clipping distance 702. Correspondingly, the ROI estimation algorithm 306 may estimate the maximum depth corresponding to a rear clipping distance (e.g., Zmax) by adjusting the frontal clipping distance 702 by the known depth of the container (e.g., determined by ULD type).

As another example, the ROI estimation algorithm 306 may estimate a side clipping distance (e.g., Xmax, illustrated in FIG. 7 by element 704) to include 3D point data extending up to, but not exceeding, the sides of the ULD by utilizing the set of marker point data. Namely, the ROI estimation algorithm 306 may estimate a maximum side value associated with the left/right sides of the fiducial markers 506a, 506b by, for example, calculating an average maximum side value for all 3D point data included as part of the sides of the respective fiducial markers 506a, 506b. The ROI estimation algorithm 306 may calculate an average maximum side value corresponding to the right side of the fiducial marker 506b placed on the right side of the ULD, and an average maximum side value corresponding to the left side of the fiducial marker 506a placed on the left side of the ULD (from the perspective of the LMU 202). The ROI estimation algorithm 306 may then calculate maximum side values corresponding to the side clipping distance 704 by adjusting the maximum side value associated with the left/right sides of the fiducial markers 506a, 506b by a fixed distance between the sides of the fiducial markers 506a, 506b and the sides of the ULD. If, for example, the right side of the right fiducial marker 506b is three inches from the right side of the ULD, then the ROI estimation algorithm 306 may add three inches to the maximum side value associated with the right side of the right fiducial marker 506b to estimate the side clipping distance 704. Accordingly, the ROI estimation algorithm 306 may estimate the side clipping distance 704 for the left side of the ULD (e.g., Xmin) by similarly adjusting the maximum side value of the left side of the left fiducial marker 506a by the known distance from the left side of the left fiducial marker 506a to the left side of the ULD.

As yet another example, the ROI estimation algorithm 306 may estimate a bottom clipping distance (e.g., Ymax, illustrated in FIG. 7 by element 706) to include 3D point data extending up to, but not exceeding, the bottom of the ULD by utilizing the set of floor point data. Namely, the ROI estimation algorithm 306 may statistically estimate a height value associated with the floor of the unobscured floor plane 506c by, for example, calculating an average height value for all 3D point data included as part of the set of floor point data. The ROI estimation algorithm 306 may simply designate the statistically estimated height value as the bottom clipping distance 706, and/or the ROI estimation algorithm 306 may adjust the statistically estimated height value by, for example, a fixed distance between the unobscured floor plane 506c and the bottom surface of the ULD to calculate the bottom clipping distance 706. Correspondingly, the ROI estimation algorithm 306 may estimate a minimum height corresponding to a top clipping distance (e.g., Ymin) by adjusting the bottom clipping distance 706 by the known height of the container (e.g., determined by ULD type).

When the ROI estimation algorithm 306 estimates clipping parameters for the set of image data, the ROI estimation algorithm 306 may identify all 3D point data (e.g., within the 3D point data 502 and/or the 3D depth image 504) representative of the ULD. The ROI estimation algorithm 306 may also generate a projected image 708 by projecting the rotated and clipped 3D point data (e.g., from the clipping image 700) back into the originally captured 3D point data 710. As a result of the method 400, the rotated and clipped 3D point data represents a clear, well-defined ULD, and the originally captured 3D point data 710 represents many erroneous and/or otherwise unintelligible 3D point data signal captures.

In embodiments, the ROI estimation algorithm 306 may be and/or include a machine learning model. Thus, some or all of the steps of the method 400 may be performed by the machine learning model. In these embodiments, the method 400 may further include training a machine learning model to locate the fiducial marker(s) within the set of image data, crop the set of image data, rotate the set of image data, and clip the rotated set of image data. For example, the processing platform 300 may include the machine learning model in memory 304. The machine learning model may include, for example, a convolutional neural network and/or any other suitable machine learning technique. The processing platform 300 may train the machine learning model using (i) a plurality of sets of image data, each set of image data featuring a respective ULD, (ii) a plurality of sets of marker point data, each set of marker point data corresponding to a respective set of image data, (iii) a plurality of sets of floor point data, each set of floor point data corresponding to a respective set of image data, and (iv) a plurality of sets of rotated and clipped image data.

Generally, the machine learning model training may take place in two steps. First, the machine learning model may analyze each set of image data of the plurality of sets of image data in an attempt to determine the corresponding sets of marker point data and the corresponding sets of floor point data. The machine learning model may determine a set of marker point data and floor point data for each set of image data that may be compared to the known marker point data and floor point data for those respective sets of image data. Based on how closely the marker point data and floor point data match the known marker point data and floor point data for each respective set of image data, the model may be adjusted to more accurately identify marker point data and floor point data in future iterations.

Second, the machine learning model may analyze the marker point data and floor point data for each respective set of image data in an attempt to determine the rotation and clipping parameters for each respective set of image data. The machine learning model may determine rotation and clipping parameters for each respective set of image data that may be compared to known rotation and clipping parameters for each respective set of image data. Based on how closely the rotation and clipping parameters for each respective set of image data match the known rotation and clipping parameters for each respective set of image data, the model may be adjusted to more accurately identify/calculate/determine rotation and clipping parameters in future iterations.

Similarly, in these embodiments, the method 400 may include applying the machine learning model to the set of image data featuring the ULD to locate the fiducial marker within the set of image data, crop the set of image data, rotate the set of image data, and clip the rotated set of image data. In this manner, the processing platform 300 may train and apply the machine learning model to automatically crop, rotate, and clip sets of image data featuring ULDs, thereby increasing the overall system efficiency by reducing the processing bandwidth necessary to perform the initial LMU configuration.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for determining rotation and clipping parameters for images of unit load devices (ULDs), the method comprising:
   capturing a set of image data featuring a ULD, wherein the set of image data featuring the ULD includes at least a three-dimensional (3D) depth image that includes 3D point data;
   locating a fiducial marker proximate to the ULD within the set of image data;
   cropping the set of image data, based upon the located fiducial marker, to generate a set of marker point data and a set of floor point data;
   rotating the set of image data based upon the set of marker point data and the set of floor point data; and
   clipping the rotated set of image data based upon the set of marker point data and the set of floor point data;
   fitting a first plane to the set of marker data points and a second plane to the set of floor data points;
   calculating a pitch angle of the 3D point data relative to the camera based upon the set of floor point data; and
   calculating a yaw angle of the 3D point data relative to the camera based upon the set of marker point data.

2. The method of claim 1, wherein the set of image data featuring the ULD comprises (i) a three-dimensional (3D) depth image that includes 3D point data and (ii) a grayscale image that includes two-dimensional (2D) point data and that is depth-aligned with the 3D depth image.

3. The method of claim 2, wherein locating the fiducial marker within the set of image data further comprises locating the fiducial marker within the 2D point data, and the method further comprises:
   projecting coordinates of the 2D point data corresponding to the fiducial marker onto the 3D point data; and
   cropping the 3D point data to generate the set of marker point data and the set of floor point data.

4. The method of claim 3, wherein projecting coordinates of the 2D point data corresponding to the fiducial marker onto the 3D point data further comprises:
   locating, using a first set of edge values corresponding to the set of marker point data, a second set of edge values corresponding to the set of floor point data.

5. The method of claim 1, wherein rotating the set of image data based upon the set of marker point data and the set of floor point data further comprises:
   rotating, based upon the set of floor point data, the set of image data on a horizontal axis by the pitch angle; and
   rotating, based upon the set of marker point data, the set of image data on a vertical axis by the yaw angle.

6. The method of claim 1, further comprising estimating (i) a set of depth clipping coordinates for the rotated set of image data based upon the set of marker point data, (ii) a set of longitudinal clipping coordinates for the rotated set of image data based upon the set of floor point data, and (iii) a set of lateral clipping coordinates for the rotated set of image data based upon the set of marker point data.

7. The method of claim 6, wherein estimating the set of depth clipping coordinates further comprises calculating a statistical depth value of the set of marker point data that is adjusted by a depth displacement of the fiducial marker within the ULD, estimating the set of longitudinal clipping coordinates further comprises calculating a statistical height value of the set of floor point data, and estimating the set of lateral clipping coordinates further comprises calculating a first set of extreme lateral coordinates corresponding to the ULD based upon a second set of extreme lateral coordinates corresponding to the set of marker point data.

8. The method of claim 1, wherein the set of image data featuring the ULD comprises (i) a three-dimensional (3D) depth image and (ii) a red-green-blue (RGB) image, and wherein the method further comprises:
   aligning the RGB image with the 3D depth image.

9. The method of claim 1, wherein the fiducial marker further comprises a plurality of fiducial markers proximate to the ULD.

10. The method of claim 1, further comprising:
    training a machine learning model using (i) a plurality of sets of image data, each set of image data featuring a respective ULD, (ii) a plurality of sets of marker point data, each set of marker point data corresponding to a respective set of image data, (iii) a plurality of sets of floor point data, each set of floor point data corresponding to a respective set of image data, and (iv) a plurality of sets of rotated and clipped image data; and applying the machine learning model to the set of image data featuring the ULD to locate the fiducial marker within the set of image data, crop the set of image data, rotate the set of image data, and clip the rotated set of image data.

11. A system for determining rotation and clipping parameters for images of unit load devices (ULDs), the system comprising:
a housing;
an imaging assembly at least partially within the housing and configured to capture a set of image data featuring the ULD;
one or more processors; and
a non-transitory computer-readable memory coupled to the imaging assembly and the one or more processors, the memory storing instructions thereon that, when executed by the one or more processors, cause the one or more processors to:
locate a fiducial marker proximate to the ULD within the set of image data, the image data includes at least a three-dimensional (3D) depth image that includes 3D point data;
crop the set of image data, based upon the located fiducial marker, to generate a set of marker point data and a set of floor point data;
rotate the set of image data based upon the set of marker point data and the set of floor point data;
clip the rotated set of image data based upon the set of marker point data and the set of floor point data;
fit a first plane to the set of marker data points and a second plane to the set of floor data points;
calculate a pitch angle of the 3D point data relative to the camera based upon the set of floor point data; and
calculate a yaw angle of the 3D point data relative to the camera based upon the set of marker point data.

12. The system of claim 11, wherein the set of image data featuring the ULD comprises (i) a three-dimensional (3D) depth image that includes 3D point data and (ii) a grayscale image that includes two-dimensional (2D) point data and that is depth-aligned with the 3D depth image.

13. The system of claim 12, wherein locating the fiducial marker within the set of image data further comprises locating the fiducial marker within the 2D point data, and the instructions, when executed by the one or more processors, further cause the one or more processors to:
project coordinates of the 2D point data corresponding to the fiducial marker onto the 3D point data; and
crop the 3D point data to generate the set of marker point data and the set of floor point data.

14. The system of claim 13, wherein the instructions, when executed by the one or more processors, further cause the one or more processors to project the coordinates of the 2D point data corresponding to the fiducial marker onto the 3D point data by locating, using a first set of edge values corresponding to the set of marker point data, a second set of edge values corresponding to the set of floor point data.

15. The system of claim 11, wherein the instructions, when executed by the one or more processors, further cause the one or more processors to:
rotate, based upon the set of floor point data, the set of image data on a horizontal axis by the pitch angle; and
rotate, based upon the set of marker point data, the set of image data on a vertical axis by the yaw angle.

16. The system of claim 11, wherein the instructions, when executed by the one or more processors, further cause the one or more processors to estimate (i) a set of depth clipping coordinates for the rotated set of image data based upon the set of marker point data, (ii) a set of longitudinal clipping coordinates for the rotated set of image data based upon the set of floor point data, and (iii) a set of lateral clipping coordinates for the rotated set of image data based upon the set of marker point data.

17. The system of claim 16, wherein estimating the set of depth clipping coordinates further comprises calculating a statistical depth value of the set of marker point data that is adjusted by a depth displacement of the fiducial marker within the ULD, estimating the set of longitudinal clipping coordinates further comprises calculating a statistical height value of the set of floor point data, and estimating the set of lateral clipping coordinates further comprises calculating a first set of extreme lateral coordinates corresponding to the ULD based upon a second set of extreme lateral coordinates corresponding to the set of marker point data.

18. The system of claim 11, wherein the imaging apparatus comprises a time-of-flight (ToF) camera and a red-green-blue (RGB) camera, the set of image data captured by the imaging apparatus further comprises (i) a three-dimensional (3D) depth image and (ii) a RGB image, and wherein the instructions, when executed by the one or more processors, further cause the one or more processors to:
align the RGB image with the 3D depth image.

* * * * *